United States Patent
Bolinth et al.

(10) Patent No.: US 7,688,797 B2
(45) Date of Patent: Mar. 30, 2010

(54) METHOD AND TRANSMISSION DEVICE FOR TRANSMISSION OF DATA IN A MULTI-CARRIER SYSTEM

(75) Inventors: Edgar Bolinth, Mönchengladbach (DE); Gesa Lorenz, Dinslaken (DE)

(73) Assignee: Gigaset Communications GmbH, Munich (DE)

( * ) Notice: Subject to any disclaimer, the term of this patent is extended or adjusted under 35 U.S.C. 154(b) by 637 days.

(21) Appl. No.: 10/525,606

(22) PCT Filed: Jul. 7, 2003

(86) PCT No.: PCT/DE03/02263

§ 371 (c)(1),
(2), (4) Date: Feb. 25, 2005

(87) PCT Pub. No.: WO2004/023752

PCT Pub. Date: Mar. 18, 2004

(65) Prior Publication Data

US 2005/0259628 A1    Nov. 24, 2005

(30) Foreign Application Priority Data

Aug. 29, 2002  (DE) ................................ 102 39 810

(51) Int. Cl.
*H04B 7/208* (2006.01)
*H04B 1/04* (2006.01)
*H04B 15/00* (2006.01)
*H04L 25/34* (2006.01)

(52) U.S. Cl. ................... 370/344; 455/63.1; 455/114.3; 455/295; 375/284; 375/285; 375/296

(58) Field of Classification Search ............... 375/346, 375/347, 348, 350; 370/344, 319
See application file for complete search history.

(56) References Cited

U.S. PATENT DOCUMENTS

| 4,513,385 | A | * | 4/1985 | Muri ........................... 702/74 |
| 5,790,516 | A | | 8/1998 | Gudmundson et al. |
| 5,848,107 | A | * | 12/1998 | Philips ....................... 375/342 |

(Continued)

FOREIGN PATENT DOCUMENTS

DE            195 20 353        12/1996

(Continued)

OTHER PUBLICATIONS

Patent Abstracts of Japan 11103285—Apr. 13, 1999.

(Continued)

*Primary Examiner*—Huy Phan
*Assistant Examiner*—Huy C Ho
(74) *Attorney, Agent, or Firm*—Occhiuti Rohlicek & Tsao LLP

(57) ABSTRACT

The present invention relates to a method for the transmission of data in a multi-carrier system, provided with a frequency band, the carrier frequencies of which are distributed in a sub-carrier band, dividing the frequency band. On the transmission side, dependent on current transmission properties, an adaptive pre-emphasis of the transmission signal is carried out for a part of the carrier frequencies in the sub-carrier band. The transmitter thus has the capacity to determine current transmission properties as well as adaptive pre-emphasis of a part of the carrier frequencies in the sub-carrier band of the transmission signal.

20 Claims, 7 Drawing Sheets

U.S. PATENT DOCUMENTS

| | | | | |
|---|---|---|---|---|
| 6,088,398 | A * | 7/2000 | Wahlqvist et al. | 375/260 |
| 6,175,550 | B1 * | 1/2001 | van Nee | 370/206 |
| 6,292,462 | B1 | 9/2001 | Cook et al. | |
| 6,304,611 | B1 * | 10/2001 | Miyashita et al. | 375/260 |
| 6,463,105 | B1 * | 10/2002 | Ramesh | 375/262 |
| 6,473,467 | B1 * | 10/2002 | Wallace et al. | 375/267 |
| 6,512,737 | B1 * | 1/2003 | Agee | 370/208 |
| 6,515,980 | B1 * | 2/2003 | Bottomley | 370/342 |
| 6,639,949 | B2 * | 10/2003 | Kroeger et al. | 375/296 |
| 6,700,866 | B1 * | 3/2004 | Heinonen et al. | 370/208 |
| 6,711,221 | B1 * | 3/2004 | Belotserkovsky et al. | 375/355 |
| 6,804,192 | B1 * | 10/2004 | Marchok et al. | 370/210 |
| 7,054,658 | B1 * | 5/2006 | Lobo | 455/553.1 |
| 7,113,549 | B1 * | 9/2006 | Isaksson et al. | 375/285 |
| 7,133,352 | B1 * | 11/2006 | Hadad | 370/208 |
| 7,215,715 | B2 * | 5/2007 | Chini et al. | 375/296 |
| 7,215,726 | B2 * | 5/2007 | Meyer et al. | 375/347 |
| 2002/0105901 | A1 | 8/2002 | Chini et al. | |

FOREIGN PATENT DOCUMENTS

| | | |
|---|---|---|
| DE | 199 00 324 | 7/2000 |
| DE | 199 34 669 | 3/2001 |
| DE | 101 29 317 | 1/2003 |
| EP | 0 562 868 | 9/1993 |
| EP | 0 938 208 | 8/1999 |

OTHER PUBLICATIONS

Patent Abstracts of Japan 10032558—Feb. 3, 1998.
IEEE Transactions on Signal Processing, vol. 50, No. 1, Jan. 2002—pp. 119-129.
Vahlin et al., Optimal Finite Duration Pulses for OFDM, IEEE Transactions on Communications, vol. 44, No. 1, Jan. 1996, pp. 10-14.
Armstrong, Analysis of New and Existing Methods of Reducing Intercarrier Interference Due to Carrier Frequency Offset in OFDM, IEEE Transactions On Communications, vol. 47, No. 3, Mar. 1999, pp. 365-369.
Slimane, "OFDM schemes with non-overlapping time waveforms" Vehicular Technology Conference, 1998, pp. 2067-2071.
Vahlin et al., Optimal Finite Duration Pulses for OFDM, Proceedings of the Global Telecommunications Conference (Globecom), San Francisco, Nov. 28-Dec. 2, 1994, New York, pp. 258-262.

* cited by examiner

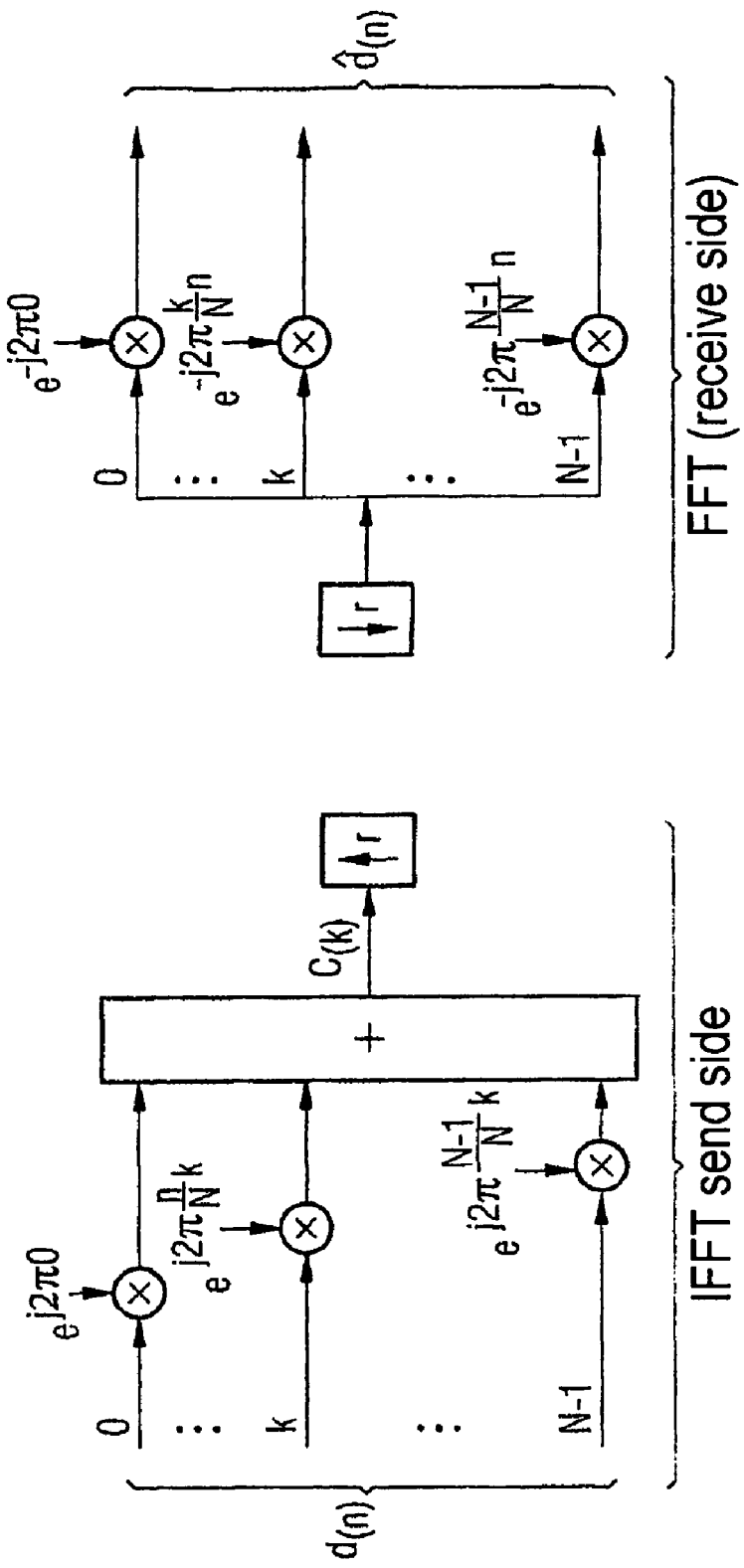

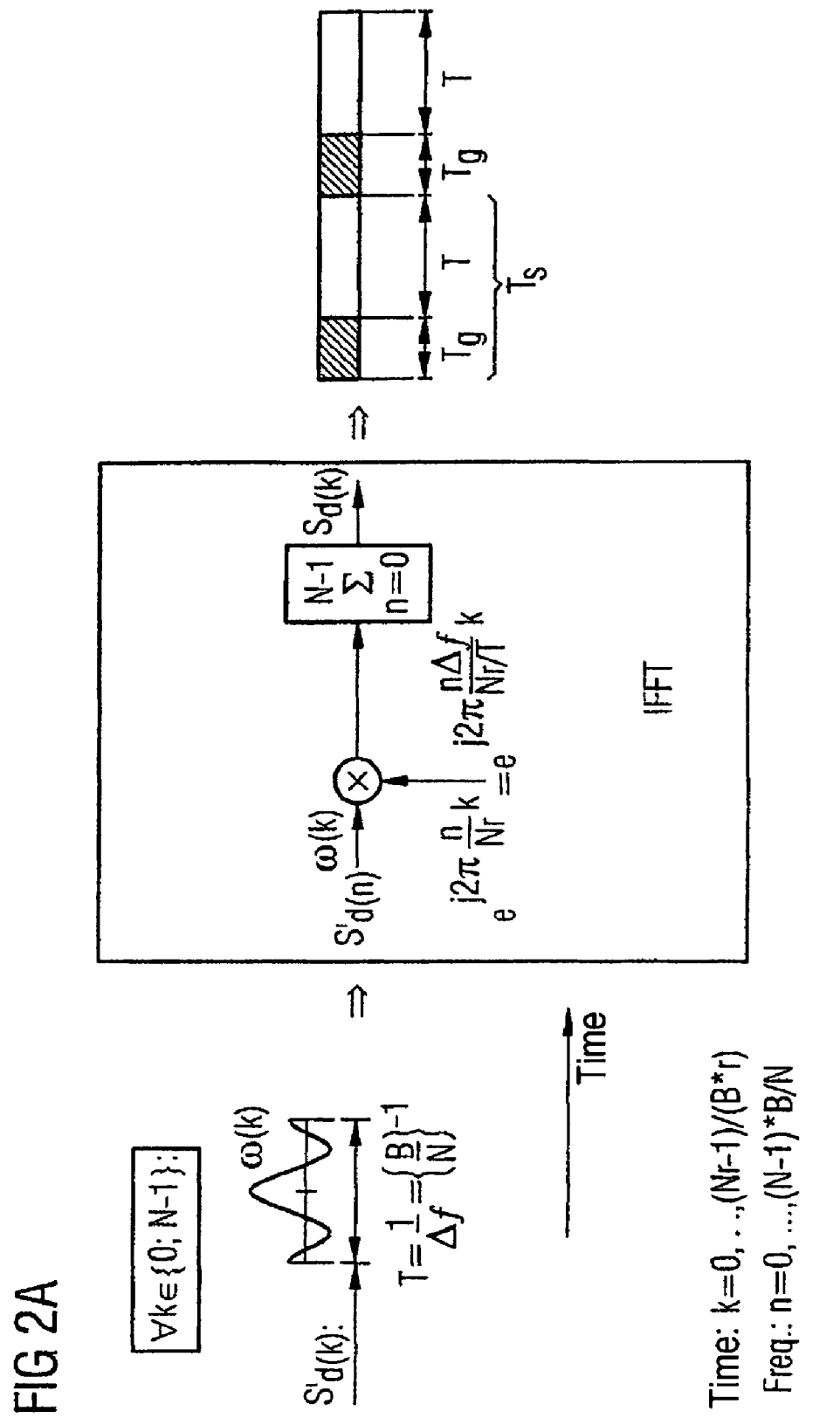

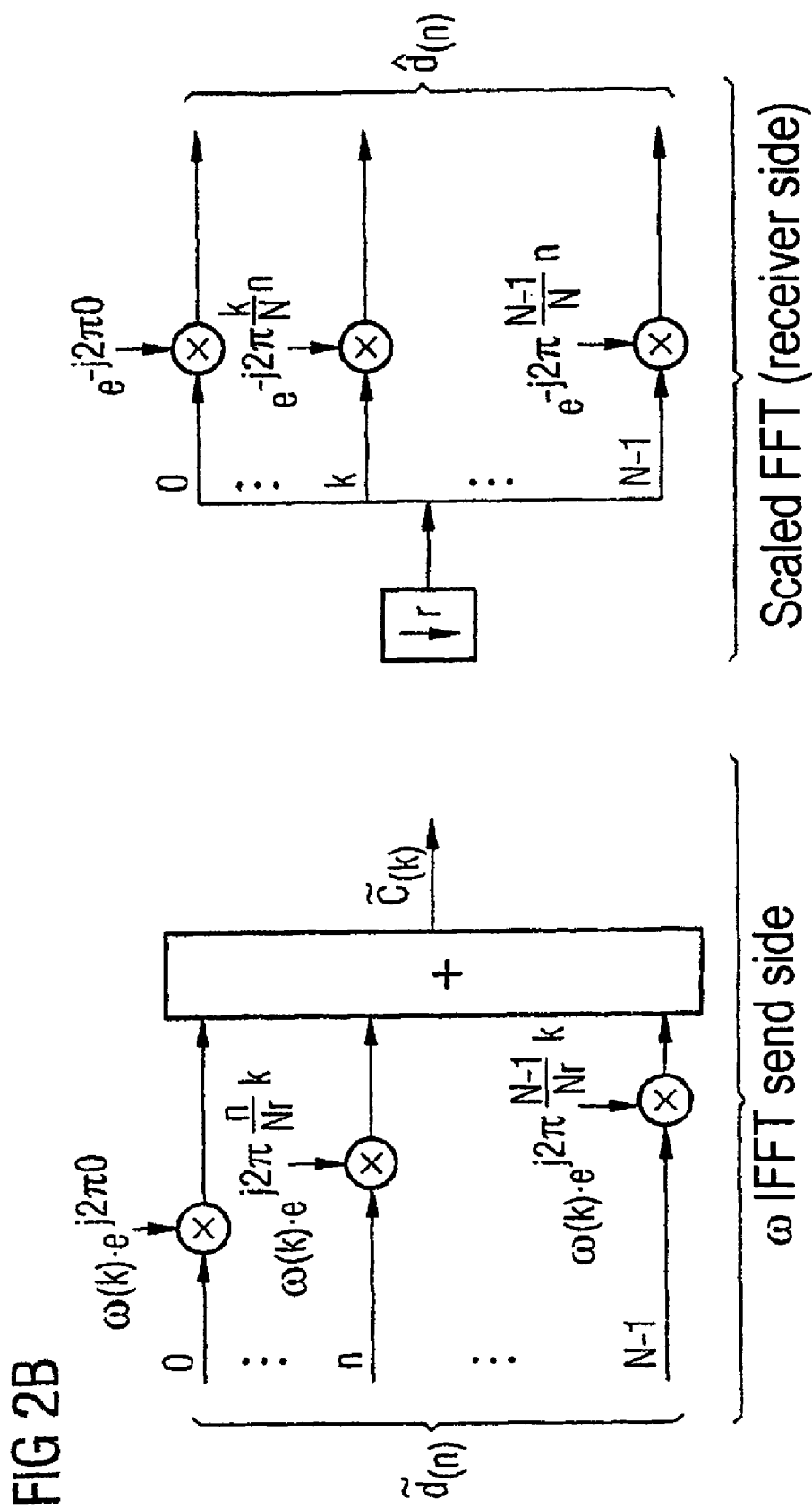

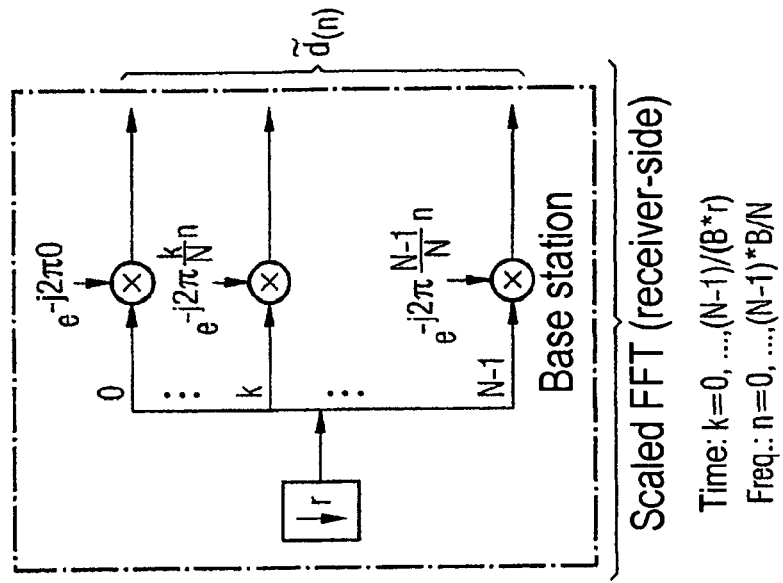
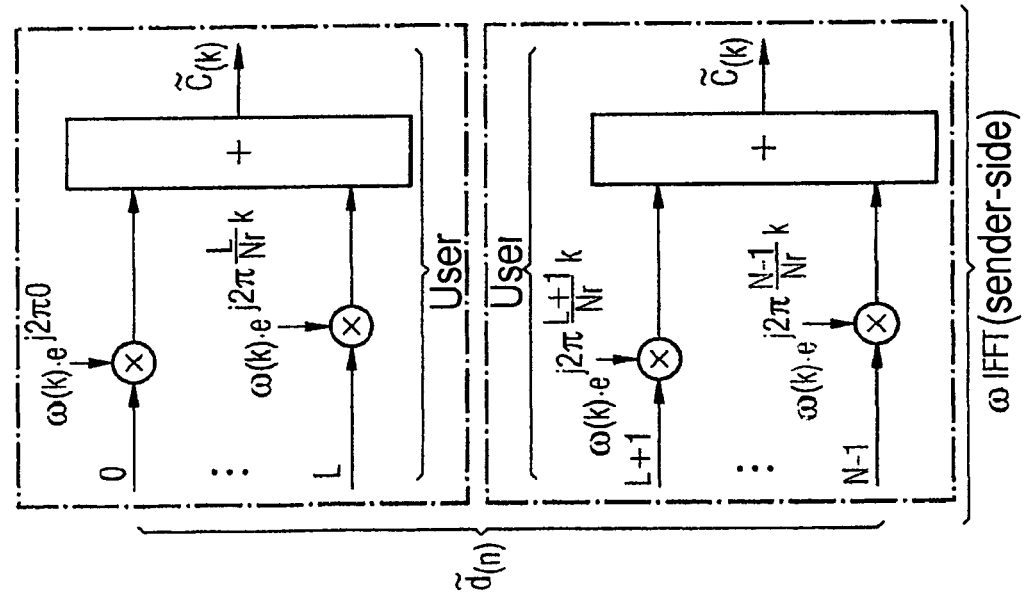

Power density spectrum with 20 MHz; subcarrier spacing = 312.5 K

----- PSD mask
—·— PSD auto correlation function of the power density spectrum
—o— PSD power density spectrum with modified subcarrier with $N_{FFT}=4$; oversampling rate=256
——— PSD power density spectrum of the original subcarrier with $N_{FFTmax}=64$; oversampling rate=16

FIG 3B

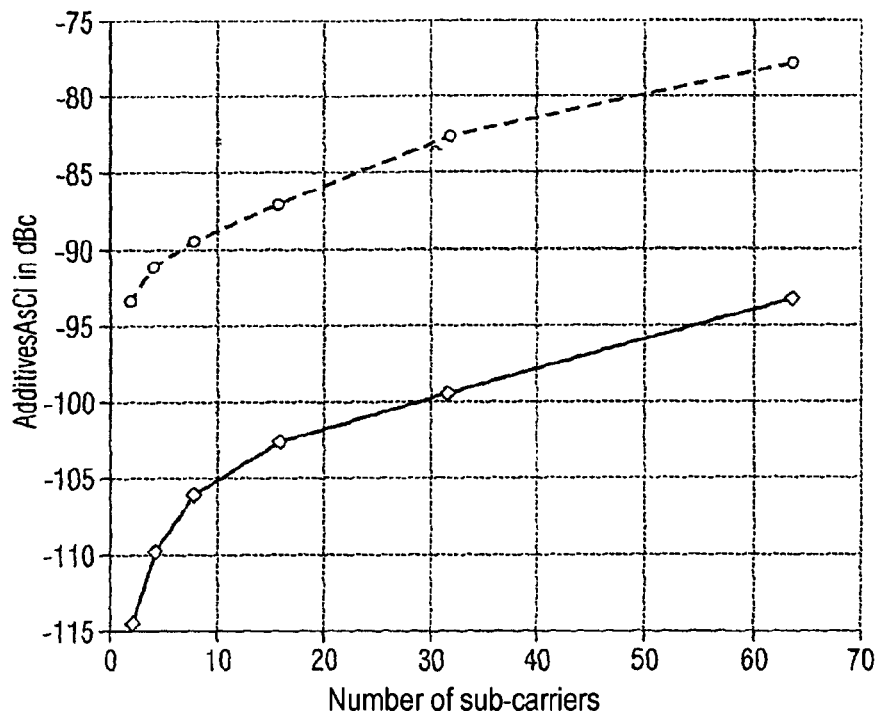

(Inter channel Interference)
AsCi with sub-carrier position = MaxNumbCoeffs=1024

- - o - - OFDM Power -80dBc f1=50 kHz f2=500 kHz
—◇— Mod. OFDM Power -80dBc f1=50 kHz f2=500 kHz
Size of the FFT:   2    4    8    16   32   64
Sampling rate:   512  256  128  64   32   16
Window size:    512  512  512  512  512  512
Gains:    21.3154  18.7443  16.5869  15.7136  16.5708  15.3561 dB
Note: For perfect reconstruction ($N_{FFT}$ <= oversampling rate must apply!!!
Note: $N_{FFT}$=4; Oversampling rate=256
Note: For perfect reconstructiion the Nyquist criterion
must be adhered to !!!

METHOD AND TRANSMISSION DEVICE FOR TRANSMISSION OF DATA IN A MULTI-CARRIER SYSTEM

BACKGROUND OF THE INVENTION

In Orthogonal Frequency Division Multiplexing OFDM, which is used particularly in WLAN radio networks, such as those functioning in accordance with the IEEE 802.11 Standard as well as for HiperLAN, a method is used in which simultaneously a number of carrier frequencies, also simply referred to as carriers, are employed for the transmission of a digital signal. However, these carrier frequencies are only modulated with a reduced transmission rate in relation to the overall transmission rate available (across all carriers).

For this purpose, the frequency band available for OFDM is subdivided into a number of (sub)carrier bands. The carrier frequency spacing is governed by the transmission rates.

An OFDMA-based access scenario in a system with a number of users (Multiple User system) is based on the approach of assigning each of the users their own OFDM sub-carrier.

In a system of this type and under real transmission conditions crosstalk effects between the carriers arise, also referred to as ICI (Inter-Channel Interferences).

ICI is produced in this case both as a result of a doppler shift arising from the movement of mobile terminals and also as a result of an oscillator phase noise.

In an OFDM system, the so-called "downlink," which in mobile communications generally identifies communication going from a base station to a mobile station, both the doppler shift as well as the part of the oscillator phase noise generally corrected/compensated in the receiver, which is called Common Phase Error (CPE), is the same for all carrier frequencies of the sub-carrier bands, so that for this communication direction no access problem triggered by the OFDMA principle arises.

A system and a method is known here from US 2002/0105901 A1 in which, by forming the signal waves, a manipulation of the spectrum of an OFDM signal is achieved.

From Staamoulis et al: "Space-time block codes OFDMA with linear preceding for multirate services," IEEE Transactions on Signal Processing, January 2002, a system is known which eliminates a multi-user interference in an OFDMA system.

From EP 0 938 208 an OFDMA/TDMA system is known with a number of users, in which sub-carriers in edge areas of a sub-carrier band are not modulated, in order to eliminate interference on adjoining frequency slots.

In the "uplink," a term generally used in mobile communication to designate the communication going in the opposite direction, from a mobile station to a base station, the problem arises of the doppler shifts not being constant over all sub-carriers as a result of the different relative speeds of the mobile subscribers. In addition, the phase noise or the correctable part of the phase noise for this communication direction is uncorrelated as a rule since it is predominantly generated by the unsynchronized oscillators of the individual users.

The Inter Channel Interference produced by the doppler shift as well as the phase noise with his/her communication direction represents, in an OFDMA-based uplink a limitation of the transmission characteristics which can go as far as resulting in a complete failure of the system.

Accordingly, the present invention seeks to specify a method as well as an arrangement which make possible an essentially interference-free OFDMA access in the uplink.

SUMMARY OF THE INVENTION

An advantage of the method in accordance with the present invention it is that a reduction which extends as far as elimination of the ICI through send-side pre-emphasis of the send signal for a part of the carrier frequencies of the sub-carrier band as a function of the current transmission facilities is achieved, since in this way the limitations of the transmission characteristics in this communication direction are removed or reduced, with the pre-emphasis relating to all or any of the sub-carriers at the edges of a frequency band which is assigned to a user and as a result has the advantage that precisely those sub-carriers of a user are pre-emphasized which contribute significantly to ICI, regardless of whether phase noise or doppler shifting is the aspect limiting the system.

Preferably, the signal is pre-emphasized with the aid of the filter by a signal filter which corresponds in the time range to a windowing and, thus, in the frequency range to a folding and is particularly identified by the fact that the filtered sub-carriers feature high rates of change and thereby make a significant contribution to ICI suppression. In addition, a receiver which is used in a system employing the inventive method needs only slight modification or no modification at all to achieve this. Filtering the sub-carriers in the edge area of an OFDM symbol also allows the guard band (i.e., the number of the unused sub-carriers at the edge of the OFDM symbol) to be reduced so that, in addition, a comparatively higher data rate can be achieved.

It is advantageous to execute the pre-emphasis such that the value of a first symbol duration assigned to the emphasized carrier frequencies remains the same. In particular, the time that range windowing or the folding operation in the frequency range is identified by the fact that the length of the time range window $\omega_{(k)}$ overall does not exceed the OFDM useful symbol duration and duration of the cyclic prefix and the required rate of change of the sub-carriers is essentially determined by the oversampling.

Preferably, the length of the OFDM user symbol duration is the same as the length of the time range window $\omega_{(k)}$. Basically, two different embodiments of the time range window $\omega_{(k)}$ exist: firstly windows which would fulfill the Nyquist criterion such as, for example, the Root-Raised-Cosine window (i.e., that despite send-side windowing or filtering of the receiver, especially with an ideal channel, is in a position to reconstruct the sent data error-free); secondly windows or filters which do not fulfill the Nyquist criteria in the sense given above but, however, by contrast allow comparatively higher filter rates of change and thereby a comparatively better ICI suppression as, for example, the Blackman window.

The number of pre-emphasized sub-carriers also basically can be extended to all sub-carriers, especially when the combination of doppler effect and phase noise is the limiting factor for the ICI.

Additional features and advantages of the present invention are described in, and will be apparent from, the following Detailed Description of the Invention and the Figures.

Additional features and advantages of the present invention are described in, and will be apparent from, the following Detailed Description of the Invention and the Figures.

BRIEF DESCRIPTION OF THE FIGURES

FIG. 2 shows send-side modulation of OFDM symbols in accordance with the inventive method.

FIG. 3a to 3b show diagrams of a simulation with a typical pre-emphasis function as well as a typical set of parameters.

DETAILED DESCRIPTION OF THE INVENTION

Figure 1A:
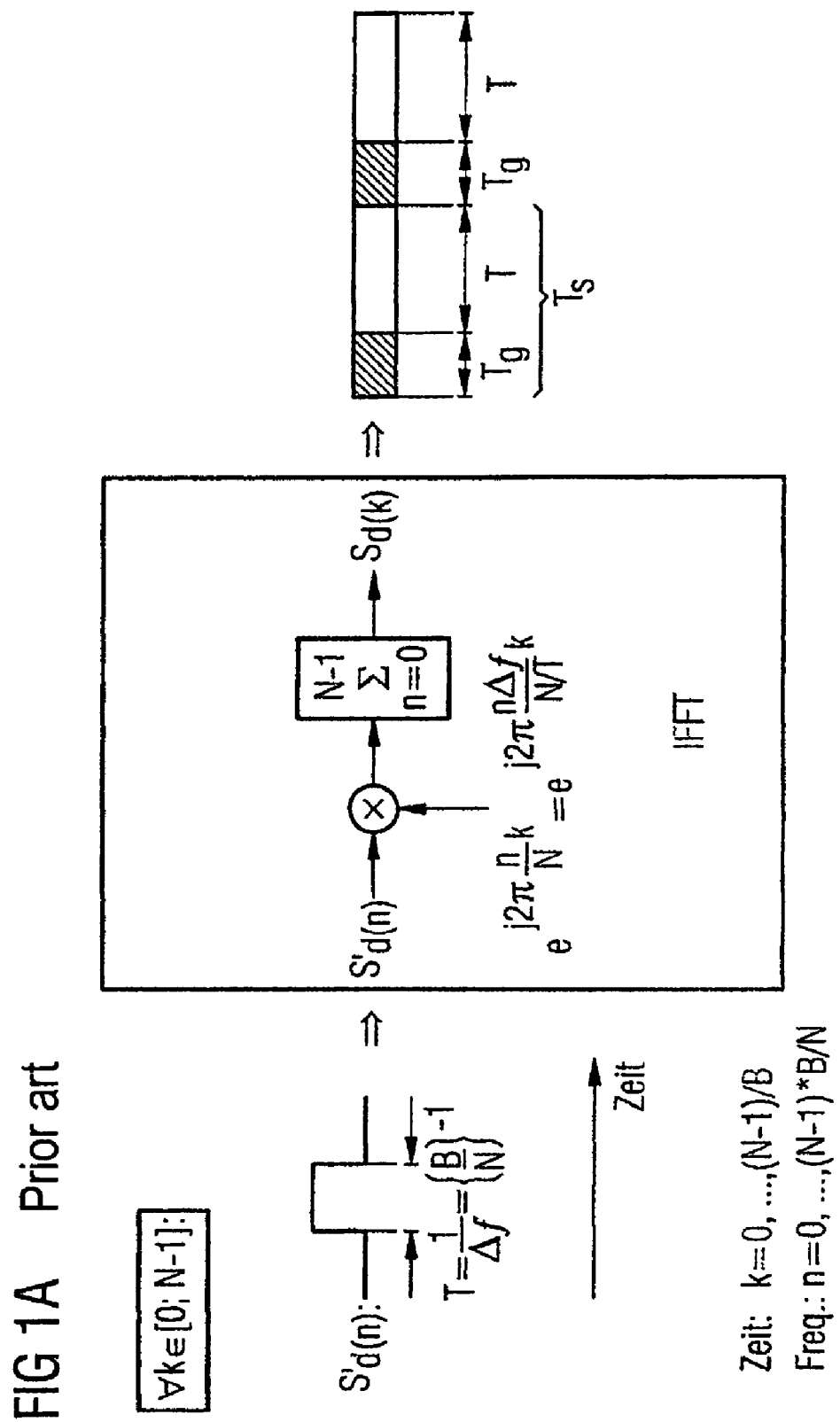
FIG. 1 shows send-side modulation of OFDM symbols in accordance with the prior art.

FIG. 1a shows a schematic diagram of the send-side modulation method in accordance with the prior art or the structure of the transmitter to execute this known method. According to the prior art, each symbol pulse $S_{d(k)}$ of a kth carrier $f_k$ for N sub-carriers of a symbol carrier band of the bandwidth B is modulated; i.e., for each symbol pulse $S_{d(k)}$ for a time window of length T an Inverse Fast Fourier Transformation (IFFT) in accordance with the formula $$S_{d(k)} = \sum_{n=0}^{N-1} S_{d(n)} e^{j2\pi \frac{n}{N} k}$$

is applied and from it an OFDM symbol $S_{d(k)}$ is generated. To counteract echoes and/or synchronization errors, this OFDM symbol $S_{d(k)}$ with duration T, through which the window length of a corresponding Fourier analysis in the receiver is also provided with a guard time (i.e., the time T will be extended by a time $T_g$) usually referred to as the guard time so that overall for the OFDM symbol to be sent $S_{d(k)}$ a symbol time $T_s$ is produced.

This modulation process is executed in accordance with the prior art for all carriers $f_k$ of a sub-carrier band with N carriers.

FIG. 1b shows the filter structure IFFT underlying the known IFFT method which is produced in accordance with the formula $$c(k) = \frac{1}{N} \cdot \sum_{n=0}^{N-1} d_{(n)} \cdot e^{j2\pi \frac{n}{N} k}$$

The receiver-side filter structure used to reverse the FFT method is identified by the formula $$\hat{d}_{(n)} = \sum_{k=0}^{N-1} c_{(k)} \cdot e^{-j2\pi \frac{k}{N} n}$$

Figure 3A:
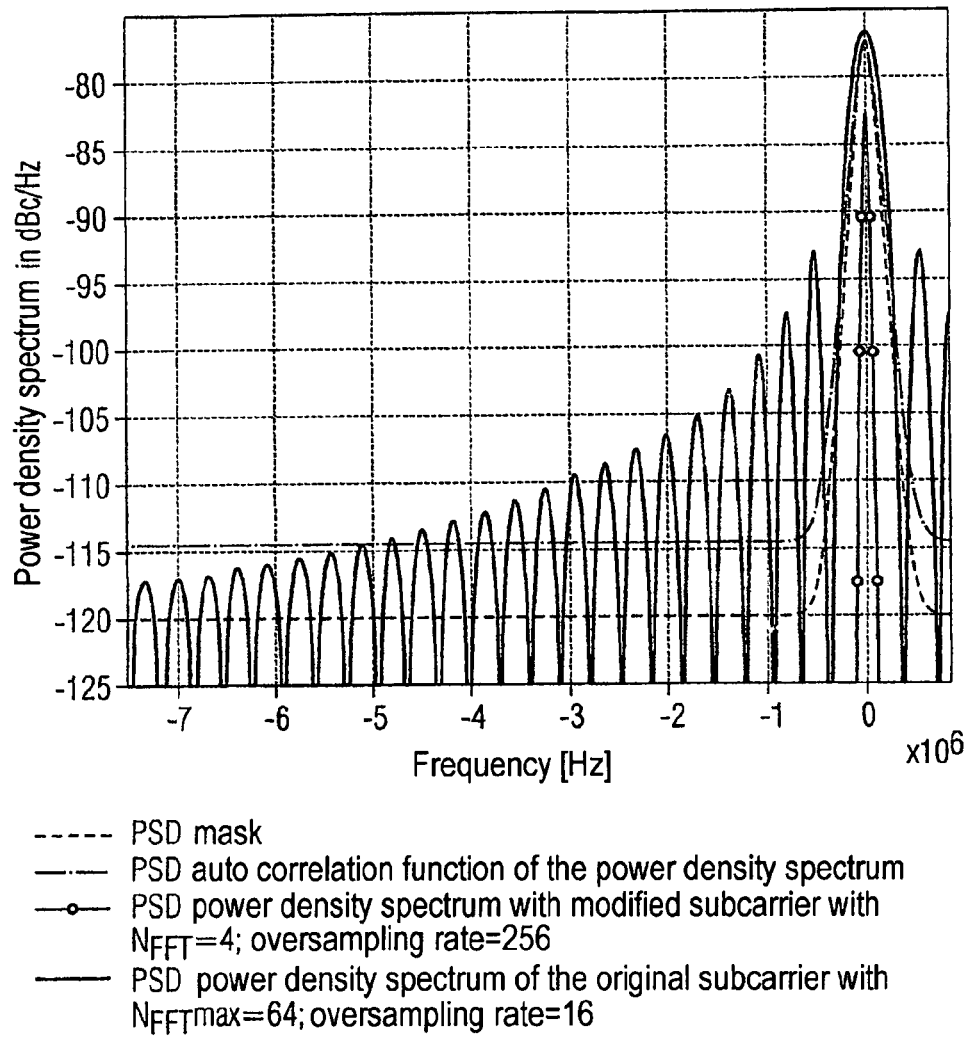

FIG. 3a shows a schematic diagram of the inventive method or structurally the essential elements of the transmitter executing the inventive method. By contrast with the procedure in accordance with the prior art in accordance with the present invention with the exception of those carriers $f_n$ which are located in the edge area of the sub-carrier band, all symbol pulses $S_{d(k)}$ assigned on the remaining carriers $f_n$ (i.e., all symbol pulses $S_{d(k)}$ on carriers $f_n$ with $\kappa \in \{0; N-1\}$, are fed to the IFFT in accordance with the prior art, whereas the symbol pulses on the carriers $f_n$ in the edge area of the sub-carrier band (i.e., the symbol pulses $S_{d(k)}$ assigned to the carriers $f_n$ with $\kappa \in \{0; Nr-1\}$ are subjected to an oversampling with the rate r and pre-emphasis, with the pre-emphasis being undertaken such that the relevant symbol pulse $S_{d(k)}$ is windowed or filtered with a pre-emphasis function so that the pre-emphasis function $\omega_{(k)}$ determines the frequency response of the pre-distorted/filtered sub-carrier.

Subsequently, all symbol pulses $S_{d(k)}$ per user are modulated up to the relevant sub-carrier frequency and, as is usual in the IFFT method accordance with FIG. 2a, added up.

In this case, for send-side pre-emphasis in accordance with the present invention, a typical filter structure shown FIG. 2b represented by the formula $$\tilde{c}_{(k)} = \frac{1}{N} \cdot \sum_{n=0}^{N \cdot r - 1} \omega_{(k)} \cdot \tilde{d}_{(n)} \cdot e^{j2\pi \frac{n}{N \cdot r} k}$$

is employed, with the pre-emphasis being achieved through linkage with a window function ω(ν) ιν τηε τιμε αρεα συχη ασ φορ εξαμπλε α "Blackman window" with oversampling. This window function is for example described by for n=0, ..., M−1 with $$\omega_{(n)} = \underbrace{\tilde{\omega}_{(n)}, 0...0, \tilde{\omega}_{(n)}}_{\frac{N \cdot r}{8} \quad \frac{N \cdot 3 \cdot r}{4} \quad \frac{N \cdot r}{8}}$$

and, $$\tilde{\omega}_{(n)} = -0.45 - 0.5 \cdot \cos\left(2\pi \frac{n}{M-1}\right) + 0.08 \cdot \cos\left(4\pi \frac{n}{M-1}\right)$$

with $$M = \frac{N \cdot r}{4}$$

preferably applying here and r giving the oversampling rate, and where the vector $\tilde{d}_{(n)}$ is defined as a result of the oversampling in the following way $$\tilde{d}_{(n)} = \begin{bmatrix} d_{(n)} \\ \vdots \\ d_{(n)} \\ 0 \\ \vdots \\ 0 \end{bmatrix} \begin{matrix} \} \forall n = [0...N-1] \\ \\ \} \forall n = [N...N \cdot r - 1] \end{matrix}$$

Furthermore, FIG. 2b shows a receive-side filter structure scaled FFT, provided to reverse the IFFT pre-emphasized by the send-side filter structure ωIFFT and described by the formula $$\hat{d}_{(n)} = \sum_{k=0}^{N-1} \tilde{c}_{(k)} \cdot e^{-j2\pi \frac{k}{N} n}$$

which, in a real system is essentially identical to a receiver structure in accordance with the prior art (FIG. 1).

FIG. 2c shows an inventive OFDMA structure in the uplink, with 2 different users (namely, User A and User B) using different sub-carrier frequency bands and where in accordance with the present invention preferably on the adjacent sub-carrier L of the first user (User A) and on the sub-carrier (L+1) of the second user (User B) the pre-emphasis is applied in order to suppress the ICI in the base station.

In FIGS. 3a and 3b, to illustrate the results of the calculation with the formulae mentioned above, illustrative diagrams with the following parameter sets

| N = | 2 | 4 | 8 | 16 | 32 | 64 |
|---|---|---|---|---|---|---|
| r = | 512 | 256 | 128 | 64 | 32 | 16 |
| M = | 512 | 512 | 512 | 512 | 512 | 512 | are shown.

In FIG. 3a, the power density spectrum of a non-ideal oscillator, the combined power density spectrum of a non-ideal transmit oscillator and of a non-ideal receive oscillator can be seen, which will be examined as representative of a time-variant fault which causes ICI. In addition, FIG. 3 shows a sub-carrier in accordance with the prior art (solid line) and a filtered sub-carrier in accordance with the invention (solid line marked with circles). It can be seen from this diagram that even with a folding in the frequency range of sub-carrier and power density spectrum of the fault, the resulting power density spectrum emits far less energy outside the frequency band assigned to a sub-carrier in each case and thereby comparatively less ICI.

FIG. 3b shows quantitatively how much ICI the sub-carrier windowed with a Blackman window generates by comparison with a sub-carrier in accordance with the prior art, with the combined reference power density spectrum of transmit and receive oscillator in accordance with FIG. 3 having been used as the power density spectrum of the fault.

Although the present invention has been described with reference to specific embodiments, those of skill in the art will recognize that changes may be made thereto without departing from the spirit and scope of the present invention as set forth in the hereafter appended claims.

The invention claimed is:

1. A method for transmitting data in a multi-carrier system to which a frequency band is assigned, for which carrier frequencies are subdivided into at least one sub-carrier band dividing the frequency band, the method comprising:
monitoring a transmission characteristic;
performing, on a send side and depending on the transmission characteristic, an adaptive pre-emphasis of a send signal for only a part of the carrier frequencies of the at least one sub-carrier band thereby reducing inter channel interference caused by at least two subscribers, wherein the carrier frequencies which are subject to the adaptive pre-emphasis are only frequencies located at an edge of the at least one sub-carrier band; and
providing that the adaptive pre-emphasis relates only to the part of the carrier frequencies of the at least one sub-carrier band.

2. A method for transmitting data as claimed in claim 1, wherein the pre-emphasis is performed by at least one of a filtering and a windowing in at least one of a time and a frequency range.

3. The method for transmitting data as claimed in claim 2, wherein the filtering is performed by a signal filter which exhibits substantially high filter rates of change in the frequency range.

4. A method for transmitting data as claimed in claim 2, wherein a window function is used which is embodied such that the windowing is executed in the time range with an oversampling being used to achieve high-filtered rates of change in the frequency range.

5. A method for transmitting data as claimed in claim 4, wherein the window function is one of a Blackman, Bartel, Kaiser, and Papoulis window function.

6. A method for transmitting data as claimed in claim 1, wherein the multi-carrier system is used in combination with an FDMA method.

7. A method for transmitting data as claimed in claim 6, wherein the FDMA method is an OFDMA method.

8. A method for transmitting data as claimed in claim 1, wherein the pre-emphasis is limited to a first and a last carrier frequency of the at least one sub-carrier which is assigned to one user.

9. A method for transmitting data as claimed in claim 8, wherein the edge areas border on other sub-carrier bands.

10. A method for transmitting data as claimed in claim 4, wherein a value of a first symbol duration assigned to one of the emphasized carrier frequencies remains the same, and wherein, with regard to one of the time range windowing and the frequency range filtering, an overall length of a time range window not exceeding an OFDM useful symbol duration as well as a duration of a cyclic prefix and a necessary rate of change of the sub-carriers is determined by the oversampling.

11. A transmit device for transmitting data in a multi-carrier system to which a frequency band is assigned, of which carrier frequencies are subdivided into at least one sub-carrier band subdividing the frequency band, comprising:
parts for monitoring a transmission characteristic; and
parts for pre-emphasis of only a certain part of the carrier frequencies of the at least one sub-carrier frequency of a send signal, which is adaptively performed depending on the transmission characteristic such that the pre-emphasis relates only to the certain part of the carrier frequencies of the at least one sub-carrier band thereby reducing inter channel interference caused by at least two subscribers, wherein the carrier frequencies which are subject to the adaptive pre-emphasis are only frequencies located at an edge of the at least one sub-carrier band.

12. A transmit device for transmitting data as claimed in claim 11, wherein the pre-emphasis is performed by at least one of a filtering and a windowing in at least one of a time and a frequency range.

13. The transmit device for transmitting data as claimed in claim 12, wherein the filtering is performed by a signal filter which exhibits substantially high filter rates of change in the frequency range.

14. A transmit device for transmitting data as claimed in claim 12, wherein a window function is used which is embodied such that the windowing is executed in the time range with an oversampling being used to achieve high-filtered rates of change in the frequency range.

15. A transmit device for transmitting data as claimed in claim 14, wherein the window function is one of a Blackman, Bartel, Kaiser, and Papoulis window function.

16. A transmit device for transmitting data as claimed in claim 11, wherein the multi-carrier system is used in combination with an FDMA method.

17. A transmit device for transmitting data as claimed in claim 16, wherein the FDMA method is an OFDMA method.

18. A transmit device for transmitting data as claimed in claim 11, wherein the pre-emphasis is limited to a first and a last carrier frequency of the at least one sub-carrier which is assigned to one user.

19. A transmit device for transmitting data as claimed in claim 18, wherein the edge areas border on other sub-carrier bands.

20. A transmit device for transmitting data as claimed in claim 14, wherein a value of a first symbol duration assigned to one of the emphasized carrier frequencies remains the same, and wherein, with regard to one of the time range windowing and the frequency range filtering, an overall length of a time range window not exceeding an OFDM useful symbol duration as well as a duration of a cyclic prefix and a necessary rate of change of the sub-carriers is determined by the oversampling.

* * * * *